United States Patent
Hill et al.

(10) Patent No.: US 10,878,495 B1
(45) Date of Patent: *Dec. 29, 2020

(54) SYSTEMS AND METHODS FOR ONBOARDING CUSTOMERS THROUGH A SHORT-RANGE COMMUNICATION CHANNEL

(71) Applicant: Wells Fargo Bank, N.A., San Francisco, CA (US)

(72) Inventors: Miranda C. Hill, Seattle, WA (US); Alicia Y. Moore, San Ramon, CA (US); Susan Symons, Mooresville, NC (US)

(73) Assignee: Wells Fargo Bank, N.A, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,869

(22) Filed: Jan. 3, 2020

Related U.S. Application Data

(63) Continuation of application No. 15/395,187, filed on Dec. 30, 2016, now Pat. No. 10,529,015.

(Continued)

(51) Int. Cl.
*G06Q 40/02* (2012.01)
*G06Q 20/32* (2012.01)

(52) U.S. Cl.
CPC ......... *G06Q 40/02* (2013.01); *G06Q 20/3278* (2013.01)

(58) Field of Classification Search
None
See application file for complete search history.

(56) References Cited

U.S. PATENT DOCUMENTS 7,766,223 B1  8/2010  Mello et al.
7,844,519 B2  11/2010  Wehunt et al.
(Continued)

OTHER PUBLICATIONS

A. Lakshminarayanan, "TAP—practical security protocols for wireless personal devices," 2004 IEEE 15th International Symposium on Personal, Indoor and Mobile Radio Communications (IEEE Cat. No. 04TH8754), Barcelona, 2004, pp. 2884-2888 vol. 4. (Year: 2004).

(Continued)

*Primary Examiner* — Roy Y Yi
(74) *Attorney, Agent, or Firm* — Foley & Lardner LLP

(57) ABSTRACT

Systems, methods, and apparatuses for enrolling a user with a product of a financial institution. A computing device associated with a financial institution includes a network interface enabling the computing device to exchange information over a network, one or more processors, and non-transitory machine-readable media storing instructions that, when executed by the one or more processors, cause the one or more processors to perform operations. The operations include establishing a short-range communication channel with a user device associated with a user based on a tap exchange and receiving personal information from the user device over the short-range communication channel. The personal information is associated with an enrollment of the user with a product of the financial institution. The operations further include providing the personal information to a computing system associated with the financial institution to enroll the user with the product.

20 Claims, 5 Drawing Sheets

Related U.S. Application Data

(60) Provisional application No. 62/317,211, filed on Apr. 1, 2016.

(56) References Cited

U.S. PATENT DOCUMENTS

| | | | |
|---|---|---|---|
| 8,141,134 | B2 | 3/2012 | Brandt et al. |
| 8,295,898 | B2 | 10/2012 | Ashfield et al. |
| 8,306,914 | B2 | 11/2012 | Johns et al. |
| 8,341,712 | B2 | 12/2012 | Machani |
| 8,417,614 | B1 | 4/2013 | Mackrell et al. |
| 8,468,090 | B2 | 6/2013 | Lesandro et al. |
| 8,651,373 | B1 | 2/2014 | Block et al. |
| 8,700,527 | B2 | 4/2014 | Dolphin et al. |
| 9,275,360 | B2 | 3/2016 | He et al. |
| 9,760,871 | B1 | 9/2017 | Pourfallah et al. |
| 9,875,470 | B2 | 1/2018 | Killoran |
| 10,529,015 | B1 * | 1/2020 | Hill ........................ G06Q 40/02 |
| 10,546,325 | B2 | 1/2020 | Friborg, Jr. |
| 2002/0123948 | A1 | 9/2002 | Yumoto |
| 2003/0139994 | A1 | 7/2003 | Jones |
| 2005/0108080 | A1 | 5/2005 | Peterson |
| 2005/0108083 | A1 | 5/2005 | Peterson |
| 2006/0116898 | A1 | 6/2006 | Peterson |
| 2007/0061254 | A1 | 3/2007 | Blunck et al. |
| 2007/0081649 | A1 | 4/2007 | Baudino et al. |
| 2007/0088952 | A1 | 4/2007 | Hewitt et al. |
| 2008/0010215 | A1 | 1/2008 | Rackley, III et al. |
| 2008/0108324 | A1 | 5/2008 | Moshir et al. |
| 2008/0109370 | A1 | 5/2008 | Moshir et al. |
| 2008/0133930 | A1 | 6/2008 | Moshir et al. |
| 2008/0189185 | A1 | 8/2008 | Matsuo et al. |
| 2010/0241535 | A1 | 9/2010 | Nightengale et al. |
| 2010/0287606 | A1 | 11/2010 | Machani |
| 2011/0004550 | A1 | 1/2011 | Giordano et al. |
| 2011/0208603 | A1 | 8/2011 | Benefield et al. |
| 2011/0276396 | A1 | 11/2011 | Rathod |
| 2012/0054095 | A1 | 3/2012 | Lesandro et al. |
| 2012/0078735 | A1 | 3/2012 | Bauer et al. |
| 2012/0109821 | A1 | 5/2012 | Barbour et al. |
| 2012/0191598 | A1 | 7/2012 | Marzo et al. |
| 2012/0216292 | A1 | 8/2012 | Richardson et al. |
| 2012/0232968 | A1 | 9/2012 | Calman et al. |
| 2012/0233066 | A1 | 9/2012 | Vallabhaneni |
| 2012/0253852 | A1 | 10/2012 | Pourfallah et al. |
| 2012/0310692 | A1 | 12/2012 | Maiya et al. |
| 2012/0316992 | A1 | 12/2012 | Oborne |
| 2012/0330830 | A1 | 12/2012 | Mason et al. |
| 2013/0012159 | A1 | 1/2013 | Lodeweyckx |
| 2013/0019013 | A1 | 1/2013 | Rice et al. |
| 2013/0041817 | A1 | 2/2013 | Greenwald et al. |
| 2013/0046634 | A1 | 2/2013 | Grigg et al. |
| 2013/0054468 | A1 | 2/2013 | Fuentes et al. |
| 2013/0065526 | A1 | 3/2013 | Pottier et al. |
| 2013/0275192 | A1 | 10/2013 | Aissa |
| 2013/0282459 | A1 | 10/2013 | Smets et al. |
| 2013/0282565 | A1 | 10/2013 | Barta et al. |
| 2014/0012739 | A1 | 1/2014 | Wall et al. |
| 2014/0019352 | A1 | 1/2014 | Shrivastava |
| 2014/0061299 | A1 | 3/2014 | Scipioni |
| 2014/0156525 | A1 | 6/2014 | Grigg |
| 2015/0039452 | A1 | 2/2015 | Barve et al. |
| 2016/0132960 | A1 | 5/2016 | Roberts et al. |

OTHER PUBLICATIONS

Ciurea, Cristian, "The Development of a Mobile Application in a Collaborative Banking System", Informatica Economica, vol. 14, No. 3, 2010, pp. 86-97.

J. Suomalainen, "Smartphone assisted security pairings for the Internet of Things," 2014 4th International Conference on Wireless Communications, Vehicular Technology, Information Theory and Aerospace & Electronic Systems (VITAE), Aalborg, 2014, pp. 1-5. (Year: 2014).

NFC Forum & Bluetooth SIG, Inc., Bluetooth Secure Simple Pairing Using NFC, Application Document, NFC Forum, Jan. 9, 2014, 39 pages.

Parno et al., "Phoolproof Phishing Prevention", CyLab, Dec. 3, 2005, 16 pages.

* cited by examiner

SYSTEMS AND METHODS FOR ONBOARDING CUSTOMERS THROUGH A SHORT-RANGE COMMUNICATION CHANNEL

CROSS-REFERENCE TO RELATED APPLICATIONS

This application is a Continuation of U.S. patent application Ser. No. 15/395,187, filed Dec. 30, 2016, which claims the benefit of and priority to U.S. Provisional Application No. 62/317,211, filed Apr. 1, 2016, both of which are incorporated herein by reference in their entireties.

TECHNICAL FIELD

Embodiments of the present disclosure relate to systems and methods to onboard customers to facilitate account enrollment.

BACKGROUND

Currently, financial institutions enroll customers in one or more of their products daily (e.g., a demand deposit account, etc.). In practice, the customer must typically visit a branch location associated with the financial institution and fill out a substantial amount of paperwork in order to enroll. Not only is such a process time-consuming and labor-intensive, such a process is prone to errors (e.g., typographical) and typically unpleasant for the customer. Accordingly, better systems and methods are needed for enrolling or onboarding customers.

SUMMARY

A first example embodiment relates to an apparatus. The apparatus includes a personal information database structured to store personal information regarding a user associated with a user device; and, a communication circuit communicably coupled to a network interface of the user interface. According to one embodiment, the communication circuit is structured to: establish a short-range communication channel with a nearby financial institution computing device based on a tap exchange; and selectively transmit personal information from the personal information database to the financial institution computing device over the short-range communication channel to enroll the user with a product of a financial institution associated with the financial institution computing device.

Another example embodiment relates to a mobile device. The mobile device includes a processor; and, a non-transitory computer readable medium storing instructions, which when executed causes the processor to perform a method. According to one embodiment, the method includes: establishing a short-range communication channel with a financial institution computing device based on a tap exchange; retrieving personal information stored in a personal information database regarding a user of the mobile device; and selectively transmitting the personal information from the personal information database to the financial institution computing device to enroll the user with a product of a financial institution associated with the financial institution computing device.

Another example embodiment relates to a method. The method includes establishing, by a network interface of a mobile device, a short-range communication channel with a financial institution computing device based on a tap exchange; receiving, by an account enrollment circuit of the mobile device, a request for personal information from the financial institution computing device; receiving, by a graphical user interface of the mobile device, an authorization to transmit the requested personal information; retrieving, by the account enrollment circuit, the personal information from a personal information database of the account enrollment circuit; and transmitting, by the network interface, the personal information to enroll the user with a product of a financial institution, the financial institution associated with the financial institution computing device.

These and other features, together with the organization and manner of operation thereof, will become apparent from the following detailed description when taken in conjunction with the accompanying drawings.

DETAILED DESCRIPTION

Figure 1:
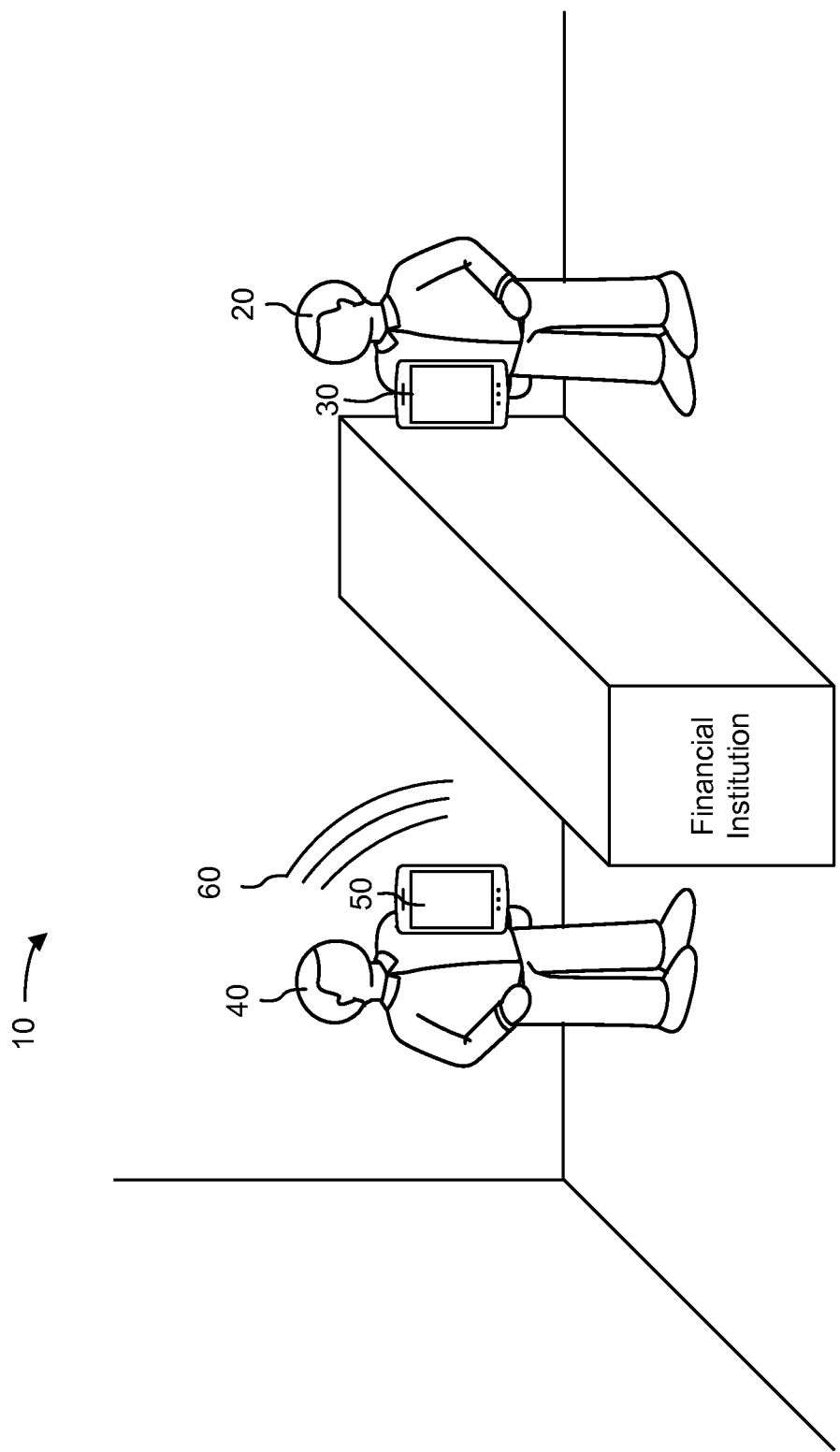
FIG. 1 is a diagram of a financial institution environment, according to an example embodiment.

Referring to the Figures generally, systems, methods, and apparatuses for enrolling or onboarding customers with a financial institution through a short-range communication channel are shown and described herein. According to the present disclosure, a user device (e.g., mobile phone) may include an account enrollment application having an account enrollment circuit. The account enrollment circuit may at least partially be disposed in a secure element (e.g., secure memory storage) of the user device, when the user device is equipped with a secure element. If the user device is not equipped with a secure element, the account enrollment circuit may be at least partially disposed in a memory device of the user device and/or in a cloud environment (e.g., a server-based infrastructure) communicably coupled to the user device. In any of the above configurations, the account enrollment circuit may include a person information database structured to store personal or confidential information regarding the user (e.g., social security number, address, phone number, next of kin, beneficiaries, etc.), an input/output circuit, and a communication circuit. The input/output circuit may enable the exchange of information with the user (e.g., via the graphical user interface of the user device). The communication circuit may be structured to establish or facilitate establishment of a short-range communication channel with a computing device of the financial institution (i.e., a financial institution computing device). After establishment, the communication circuit may selectively provide personal information from the personal information database to the financial institution computing device. In response, the financial institution computing device may populate an account registration form(s) to enroll or onboard the customer with the financial institution. Simultaneously or nearly simultaneously, the account enrollment circuit may provide an account enrollment application on the user device that allows the user to observe and modify information provided to the financial institution computing device. In this regard, the user may be able to confirm or deny accuracy of personal information.

Beneficially, the account enrollment circuit facilitates a relatively faster enrollment process than manually filling out paperwork. Further, the account enrollment circuit reduces or alleviates the likelihood of transcription errors by providing personal information received directly from the user (as compared to an attendant at the financial institution listening to the user and transcribing the user's information). Further, by electronically providing the enrollment information, the financial institution may update their accounts database or other relevant storage location relatively faster than relying on manual transmission by the attendant. In this regard, the customer may engage or utilize one or more financial products of the financial institution relatively faster than in conventional systems.

Technically and advantageously, the account enrollment circuit transforms operation of the user device by storing and selectively providing personal information regarding the user. Typically, the user or customer shields their personal information from exposure and, many people may feel wary of having this information stored on a mobile device (e.g., a smartphone) because of the potentiality of the mobile device being hacked or the user losing the mobile device. By storing the person information in either a cloud environment or in a secure element, the mobile device may provide functionality and security that was previously inexistent. As a result, operation of the mobile device is transformed to realize previously inexistent functionality.

Moreover, by utilizing a short-range communication channel (e.g., Bluetooth, near-field communication (NFC), etc.), the systems, methods, and apparatuses of the present disclosure transform traditional enrollment processes into a relatively secure and efficient process. In this regard, the short-range communication channel restricts the distance that the customer and financial institution computing device can be apart to still enable enrollment. As such, the ability for fraudsters to intercept these communications may be reduced. Thus, the systems, methods, and apparatuses of the present disclosure may provide secure and relatively fast wireless enrollment processes.

As used herein, the terms "enrollment" and "on-boarding" are used interchangeably to refer to registration or sign-up for one or more financial institution products (e.g., open a checking or savings account, etc.). According to one embodiment, the enrollment or on-boarding refers to a first-time enrollment process for the user with a specific financial institution. In this regard, the financial institution does not have a previous record regarding the user. However, the principles of the present disclosure may also be applicable with subsequent enrollments (e.g., an application for a loan at the financial institution where the user has an existing demand deposit account). In this regard, the information stored in the personal information database (described below) may be richer than that stored in the financial institution computing system. As such, the systems, methods, and apparatuses of the present disclosure are applicable with both first-time and non-first time enrollments.

It should be understood that the term "product" as associated with a financial institution refers to a service or product offered by the financial institution and, as such, may be highly variable. For example, a non-exhaustive list of financial institution "products" includes, but is not limited to: a demand deposit account (e.g., a checking account, a savings account, etc.), a mortgage application, a certificate of deposit account, a money market account, an individual retirement account, and a loan application (e.g., a student loan application, a private loan, etc.). Thus, the "product" of the financial institution is meant to be broadly interpreted herein. In this regard and as described herein below, the "financial institution" may be highly configurable as well, with all such variations intended to fall within the scope of the present disclosure.

Referring now to FIG. 1, a diagram of a financial institution environment is depicted, according to an example embodiment. As shown, an interior physical location (i.e., brick and mortar) of a financial institution 10 is depicted. The financial institution 10 is shown to include an attendant 20 utilizing a financial institution computing device 30 and a user 40 (also referred to as a customer herein) utilizing a user device 50, shown as a smartphone. The financial institution 10 may include any type of financial institution including, but not limited to, a bank, a credit union, and the like. It should be understood that while the present disclosure describes on-boarding and enrollment in regard to financial institutions that this description is not meant to be limiting. In this regard, the present disclosure may be applicable with any enrollment process done in person where confidential information is exchanged. For example, the present disclosure may be applicable in a mortgage company setting to, e.g., fill out a mortgage application. In another example, the present disclosure may be applicable in a student loan company setting to fill out a student loan application. Thus, the principles contained herein are meant to be broadly interpreted.

The financial institution computing device 30 may include any type of computing device used by financial institution attendants that is capable of a short-range communications. Accordingly, the financial institution computing device 30 may include, but is not limited to, a mobile phone (e.g., smart phone), tablet computer, a personal computer, and any other computing device. In the example shown, the computing device 30 is structured as tablet computer. Similarly, the user device 50 may include any type of mobile device of a user 40 including, but not limited to, a phone (e.g., a smartphone, etc.) and a computing device (e.g., a tablet computer, a laptop computer, a person digital assistant, etc.).

In operation, the user 40 may "tap" the user device 50 with the financial institution computing device 30 to establish a short-range communication channel 60. As used herein, the term "tap" refers to an initial pairing or pairing process of the mobile device 50 with the financial institution computing device 30 to establish a short-range communication channel (e.g., short-range communication channel 60). In this regard and in one embodiment, the "tap" is a NFC tap. In another embodiment, the "tap" is a Bluetooth communication protocol pairing process. In either embodiment, the "tap" may also include various other additional security protocols (e.g., passcodes, biometrics, etc.) that augment the "tap" to ensure or substantially ensure that the tap was intended between each of the user device 50 and the financial institution computing device 30.

In one embodiment, the communication channel 60 may comprise solely the Bluetooth communication protocol. As an example, the user 40 may initiate a Bluetooth communication protocol on their mobile device 50. The attendant 20 may initiate a Bluetooth communication protocol on the financial institution computing device 30. Upon locating the computing device 30, the financial institution computing device 30 may pair with the user device 50 (i.e., the "tap" in this example) to enable the exchange of information. As explained herein and due to the relative sensitivity of the personal information, the user 40 and/or financial institution attendant 20 may configure their settings to prohibit automatic coupling after an initial pairing of the devices.

In another embodiment, the communication channel 60 may comprise solely the NFC protocol. While the Bluetooth communication protocol typically requires an initial pairing of devices, the NFC protocol typically does not. However, the NFC protocol is limited to only being applicable in short proximity (e.g., typically within four inches of each device). Once in range, the user device 50 and the computing device 30 may begin to exchange information over the communication channel 60. Beneficially, using NFC, the user device 50 and computing device 30 may be required to be in close proximity for the duration of the communication, which may act as an added layer of security during the on-boarding process.

In still another embodiment, the communication channel 60 may comprise a combination of NFC and Bluetooth communication protocols. As an example, the user device 50 and computing device 30 may tap via the NFC protocol to exchange authentication information. The user 40, via a graphical user interface on the mobile device 120, may receive and observe a request from the computing device 30 to establish a link (e.g., the communication channel). Upon reception of an acceptance or approval of the request, the user device 50 and/or the computing device 30 may provide a "handover request," the handover request structured to enable Bluetooth pairing between the devices 50 and 30 to enable exchange of information over the Bluetooth communication protocol.

Beneficially, using a NFC tap to initiate pairing followed by Bluetooth data transmission enables relatively more security in the communications between the user device 50 and the financial institution computing device 30 because of the requirement of the NFC tap (i.e., that the devices 30 and 50 be in NFC proximity to each other).

It should be understood that the three short-range communication channels that represent the communication channel 60 described above are not meant to be limiting as the present disclosure contemplates any and all other types of short range communication channels that are intended to fall within the scope of the present disclosure. As described herein, after establishment of the communication channel 60, the user device 50 and the computing device 30 may exchange information to enable onboarding of the user 40 with the financial institution 10.

Figure 2:
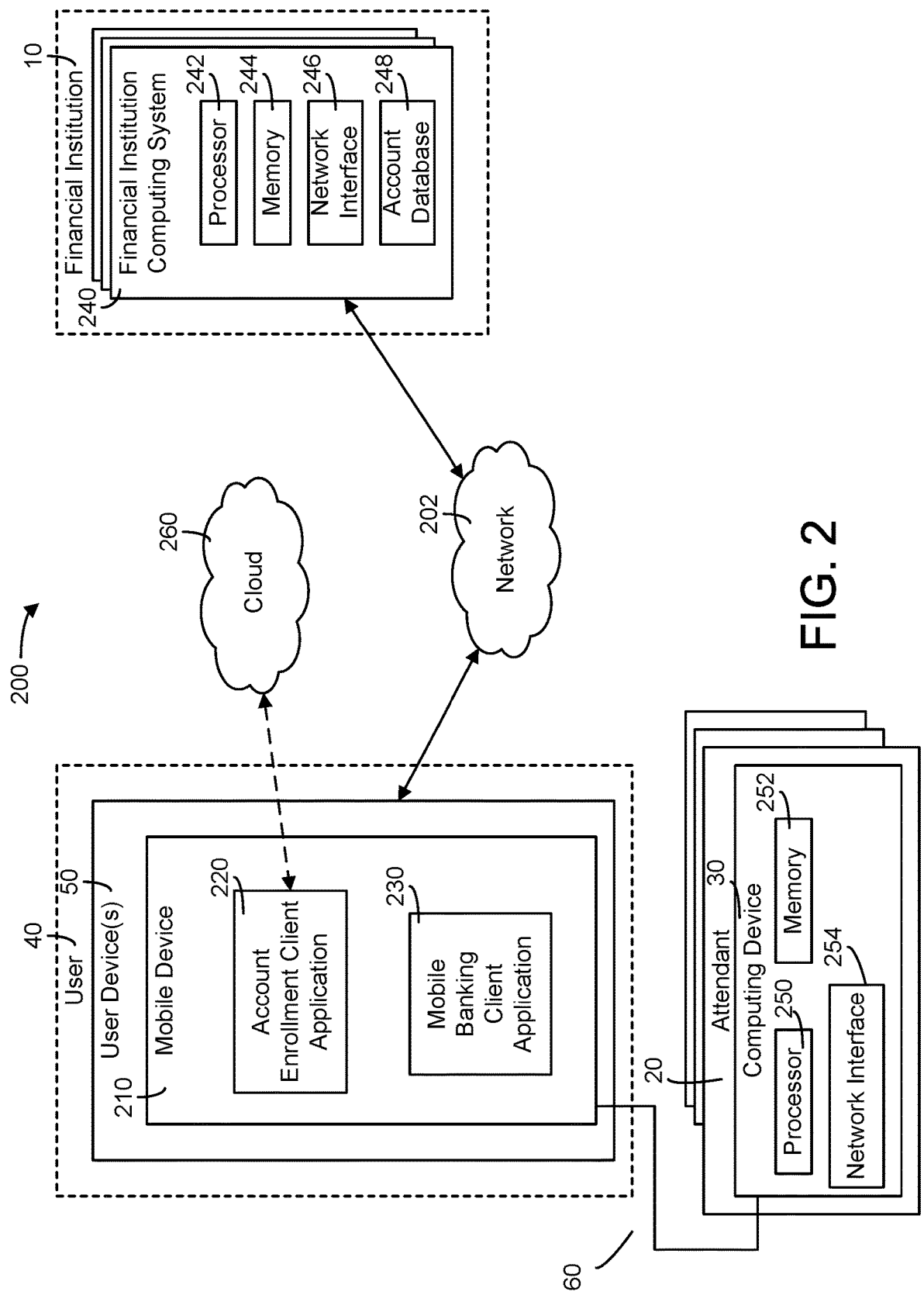
FIG. 2 is a schematic diagram of a computing system, according to an example embodiment.

Referring now to FIG. 2, a block diagram of a computing system 200 is shown according to an example embodiment. The computing system 200 may schematically represent the components of FIG. 1, according to an example embodiment. As described herein, the computing system 200 may enable a tap connection between a user device 50 of a user 40 and a computing device 30 of an attendant 20 of a financial institution 10 to initiate establishing a communication channel 60 that is relatively secure to allow the exchange of personal information of the user 40 to the financial institution computing device 30 to facilitate a relatively quick enrollment of the user 40 with the financial institution 10. As shown, the computing system 200 includes one or more user devices 50 associated with a user 40, one or more financial institution computing devices 30 associated with an attendant 20 of the financial institution 10, and a financial institution computing system 240 associated with the financial institution 10. The user device 50, financial institution computing device 30, and financial institution computing system 240 may be communicably and operatively coupled over a network 202. The network 202 may be any type of type of network. For example, the network 202 may be a wireless network interface (e.g., 802.11X, ZigBee, Internet, WI-FI, etc.), a wired network interface (e.g., Ethernet), or any combination thereof. The network 202 is structured to permit the exchange of data, values, instructions, messages, and the like between and among the user device 50, financial institution computing device 30, and the financial institution computing system 240.

As shown, the user device 50 and the financial institution computing device 30 may be communicably and operatively coupled to a cloud 260. The cloud 260 refers to a computing style where computing resources including, but not limited to, server components including processors, storage or memory components, application programs, and the like are stored in one or more remote locations and provided over a network, such as network 202, to a device upon request (such as to the user device 50). In this regard, the cloud 260 may also be referred to as a cloud-based server herein. Beneficially, such a structure enables the device to have or store relatively less native applications to, in turn, improve processing speed. Further, by storing data in the cloud 260, the user 40 may access that data from one or more different user devices 50.

As also shown, the financial institution 10 includes a financial institution computing system 240. The financial institution computing system 240 includes a processor 242 and a memory device 244. The processor 242 may be implemented as a general-purpose processor, an application specific integrated circuit (ASIC), one or more field programmable gate arrays (FPGAs), a digital signal processor (DSP), a group of processing components that may or may not be geographically dispersed (e.g., situated in various locations to form a server-based network), or other suitable electronic processing components. The one or more memory devices 244 (e.g., RAM, ROM, NVRAM, Flash Memory, hard disk storage, etc.) may store data and/or computer code for facilitating at least some of the various processes described herein. In this regard, the memory 244 may store programming logic that, when executed by the processor 242, control the operation of the financial institution computing system 240.

As shown, the financial institution computing system 240 includes a network interface 246. The network interface 246 facilitates the sending and receiving of data over the network 202 (e.g., to and from the user device 50, etc.). The financial institution computing system 240 may also include an accounts database 248 that stores customer information and account information relating to accounts held with the financial institution 10 of various customers.

As mentioned above, the attendant 20 may be associated with or have one or more computing devices 30 (i.e., the "financial institution computing device"). The attendant 20 may be any representative of the financial institution 10 (e.g., a teller, banker, etc.) who may facilitate on-boarding for the user 40. As also mentioned above, the computing device 30 may include any type of computing device capable of establishing a short-range communication channel 60. Thus, and as mentioned above, the financial computing device 30 may include a tablet computer, a smartphone, and the like.

As shown, the financial computing device 30 includes a processor 250, a memory 252 communicably coupled to the processor 250, and a network interface 254. The memory 252 may store instructions that, when executed by the processor 250, cause implementation of a routine to facilitate connecting via the network interface 254 with the user device 50 (and financial institution computing system 240). The processor 250 may be implemented as a general-purpose processor, an application specific integrated circuit (ASIC), one or more field programmable gate arrays (FP-GAs), a digital signal processor (DSP), a group of processing components, or other suitable electronic processing components. The one or more memory devices 252 (e.g., RAM, ROM, NVRAM, Flash Memory, hard disk storage, etc.) may store data and/or computer code for facilitating at least some of the various processes described herein, such as facilitating communicable connection with the user device 50. The network interface 254 includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Further, the network interface 254 may include cryptography capabilities to establish a secure or relatively secure communication session with the user device 50 via the communication channel 60.

As shown in FIGS. 1-2 and mentioned above, the user 40 may have or be associated with a user device 50. The user 40 may include individuals, business representatives, large and small business owners, and any other entity. The user may also be referred to as the customer herein to signify that the customer or user 40 may be new to the financial institution 10. Hence, the user 40 may be enrolling with the financial institution 10 to receive or utilize one or more financial institution products (e.g., establishment of a demand deposit account). The user device 50 may be generally described as a mobile device 210. The mobile device 210 may include any wearable device. Wearable devices refer to any type of device that a user wears including, but not limited to, a watch (e.g., a smart watch), glasses (e.g., eye glasses, sun glasses, smart glasses, etc.), bracelet (e.g., a smart bracelet), etc. The mobile device 210 may also include any type of mobile device of a user 40 including, but not limited to, a phone (e.g., a smartphone, etc.) and a computing device (e.g., a tablet computer, a laptop computer, a person digital assistant, etc.). Accordingly, the user device 50 may include a display device (e.g., a screen) and one or more input/output devices (e.g., a touch screen, microphone, speaker, keyboard, etc.).

In this example, the user device 50 includes an account enrollment client application 220 and a mobile banking client application 230. In one embodiment, the account enrollment client application 220 and the mobile banking client application 230 may be server or cloud 260-based applications executable on the user device 50. In this regard, a user may have to first download the application(s) prior to their usage. In another embodiment, the account enrollment client application 220 and the mobile banking client application 230 may be hard coded into the memory (e.g., memory 303 of user device 50 of FIG. 3). In still another embodiment, the account enrollment client application 220 and the mobile banking client application 230 may be web-based interface applications. In this configuration, the user may have to log onto or access the web-based interface before usage of the application(s). In this regard, at least one of the account enrollment client applicant application 220 and the mobile banking client application 230 may be supported by a separate computing system comprising one or more servers, processors, network interface modules, etc. that transmit the applications for use to the user device 50. In certain embodiments, the account enrollment client application 220 and the mobile banking client application 230 may include an application programming interface (API) and/or a software development kit (SDK) that facilitate the integration of other applications with at least one of the account enrollment client application 220 and the mobile banking client application 230. All such variations and combinations are intended to fall within the spirit and scope of the present disclosure.

The mobile banking client application 230 may be communicably coupled to the financial computing system 240 (e.g., the accounts database 248) via the network 202 and may be structured to permit management of the user's accounts via the mobile banking client application 230. In this regard, the mobile banking client application 230 may provide displays indicative of current account balances, pending transactions, profile information (e.g., contact information), and the like. Further, in some embodiments, the mobile banking client application 230 may also permit payments from the user 40 to a designated recipient. For example, the mobile banking client application 230 may depict a loan (e.g., a mortgage) of a user and allow the user to pay the mortgage from one of their accounts (e.g., checking or savings). In another example, a bill pay option may be provided by the mobile banking client application 230, where the bill pay option allows the user 40 to pay his/her bills.

The mobile banking client application 230 may be utilized or accessible following enrollment with the financial institution 10. In this regard, the mobile client application 230 may be executable after the user 40 enrolls or on-boards with the financial institution 10. Hence, the mobile banking client application 230 may be a product of the financial institution 10 that is retrievable, executable, and useable following registration or enrollment of the user 40 with the financial institution 10.

As shown, the account enrollment client application 220 may be communicably coupled to a cloud 260. In this regard and as mentioned above, the account enrollment client application 220 may be either one of a cloud-based application (where the application must first be downloaded) or a web-based application (where the user logs onto the application over a website). However, in another embodiment, the account enrollment client application 220 may be completely housed or embodied within the user device 50. This embodiment is described and shown here in in FIG. 3. In still another embodiment, only one or more components of the client application 220 may be housed within or included with the user device 50. For example, the cloud 260 may be structured to include the personal information database 346 yet the input/output circuit 342 and the communication circuit 344 are stored in the user device 50, such that confidential or personal information of the user 40 is remotely stored relative to the user device 50. This configuration may be beneficial when the user device 50 does not include a secure memory device, such as the secure element 330 of FIG. 3. Thus, both embodiments—inclusion of the account enrollment circuit 340 in the user device 50 completely or inclusion of the account enrollment circuit 340 only partially (e.g., the personal information database 346 is stored in the cloud 260)—are intended to fall within the spirit and scope of the present disclosure. As alluded to above, the structure and function of the first embodiment may be explained more fully in regard to FIG. 3.

Figure 3:
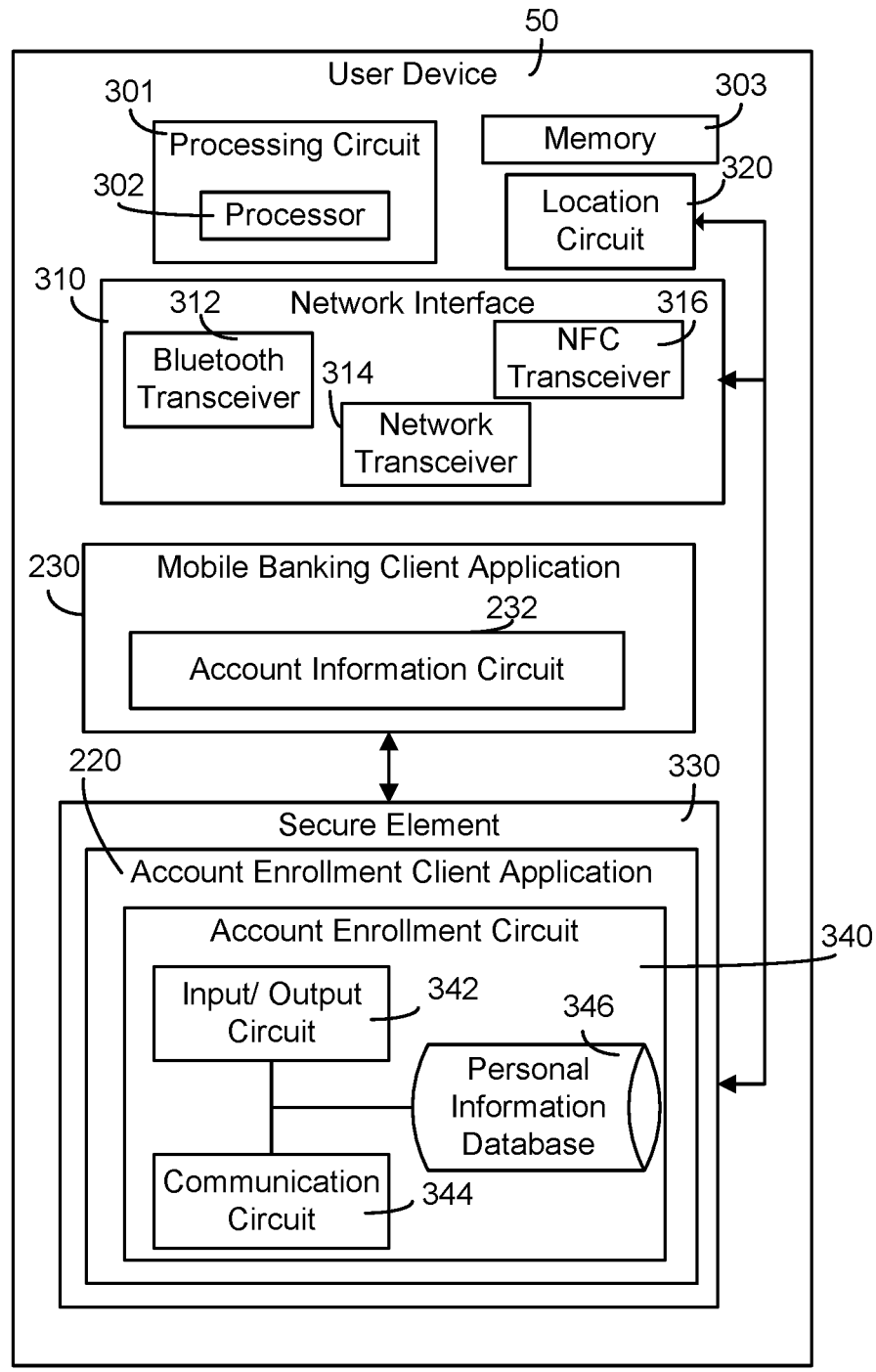
FIG. 3 is a diagram of a user device of the computing system of FIG. 2, according to an example embodiment.

Accordingly, referring now to FIG. 3, the function and structure of the user device 50 is shown in greater detail according to an example embodiment. As mentioned above, the example of FIG. 3 depicts the complete inclusion of the account enrollment circuit 344 with the user device 50 as compared to aforementioned other embodiments (e.g., partial inclusion with the user device or that the entire account enrollment circuit 344 is remotely located, such as in the cloud 260).

As shown, the user device 50 includes a processing circuit 301 having a processor 302 and a memory 303. The processor 302 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 303 (e.g., RAM, NVRAM, ROM, Flash Memory, hard disk storage, etc.) may store data and/or computer code for facilitating the various processes described herein. Moreover, the one or more memory devices 303 may be or include tangible, non-transient volatile memory or non-volatile memory. Accordingly, the one or more memory devices 303 may include database components, object code components, script components, or any other type of information structure for supporting the various activities and information structures described herein.

The user device 50 is shown to include various circuits, components, and logic for completing at least some of the activities described herein. More particularly, the user device 50 includes a network interface 310, the mobile banking client application 230 having an account information circuit 232, a location circuit 320, and a secure element 330 having the account enrollment client application 220 that includes the account enrollment circuit 340. While various circuits, interfaces, and logic with particular functionality are shown in FIG. 3, it should be understood that the user device 50 may include any number of circuits, interfaces, and logic for completing the functions described herein. For example, the activities of multiple circuits may be combined as a single circuit, as additional circuits with additional functionality may be included, etc.

The network interface 310 is adapted for and structured to establish a communication session via the network 202 with the financial computing system 240. Further, the network interface 310 is structured to also establish the communication channel 60 with the financial institution computing device 30. In this regard and as shown, the network interface 310 includes a Bluetooth transceiver 312, a network transceiver 314, and a NFC transceiver 316. The network transceiver 314 may be structured to establish a communication session over the network 202. Accordingly, the network interface 310 includes any of a cellular transceiver (e.g., CDMA, GSM, LTE, etc.), a wireless network transceiver (e.g., 802.11X, ZigBee, WI-FI, Internet, etc.), or a combination thereof (e.g., both a cellular transceiver). In comparison, the Bluetooth transceiver 312 and the NFC transceiver 316 are structured to selectively establish a Bluetooth communication session (via the Bluetooth transceiver 314) and a NFC communication session (via the NFC transceiver 316) with the financial institution computing device 30. The Bluetooth transceiver 312 and NFC transceiver 316 may include any components for facilitating and establishing a communication session via the Bluetooth communication protocol and the NFC protocol.

Further, the network interface 310 may include cryptography capabilities to establish a secure or relatively secure communication session with the at least one financial computing system 240 or financial institution computing device 30. In this regard, data may be encrypted to prevent or substantially prevent the threat of hacking.

The location circuit 320 may be structured to receive location data and determine a location of the user device 50 based on the location data. In one embodiment, the location circuit 320 may include a global positioning system (GPS), parts thereof, or any other type of location positioning system. As such, the location circuit 320 may receive latitude data, longitude data, and any other type of location or position data to determine the location of the user device 50. In other embodiments, the location circuit 320 may receive an explicit location identification from the user of the device 50. All such variations are intended to fall within the spirit and scope of the present disclosure.

As mentioned above, via the mobile banking client application 230, the user may pay bills (e.g., mortgage, etc.), view balances, and otherwise manage their account. Accordingly and as shown, the mobile bank client application 230 may include an account information circuit 232. The account information circuit 232 may be linked or otherwise coupled to one or more accounts held by a user and permit management of the associated account (e.g., transfer balances between accounts, see payment history, etc.). The mobile banking client application 230 may also be communicably coupled to the account enrollment circuit 340. As such and as mentioned above, responsive to a successful enrollment of the user 40 with the financial institution 10, the mobile banking client application 230 may be utilized and the account information circuit 232 activated.

The secure element 330 may be defined as a tamper-resistant component capable of hosting and storing confidential information and applications. In this regard, the secure element 330 may include a removable smart chip, a fixed chipped in the user device 50, or within a SD card. In other words, the secure element 330 may be configured as a chip embedded directly into the user device's 50 hardware, a SIM or UICC card, or an SD card that can be inserted and removed from the user device 50. Thus, the secure element 330 may include relatively more security to resist tampering or hacking. In this regard, the secure element 330 is shown as separate from the memory device 303. Of course, certain embodiments of the user device 50 may exclude a secure element 330. In those embodiments, the account enrollment circuit 340 may be simply included with the user device 50 (e.g., with the memory device 303). Thus, the depiction of the user device 50 including a secure element 330 is intended to show one configuration of the present disclosure and not meant to be limiting.

The account enrollment circuit 340 may be structured to generate and provide the account enrollment client application 220. For example, the account enrollment circuit 340 may provide the account enrollment client application 220 as a graphical user interface on the user device 50 (see FIG. 4). Further and as described herein, the account enrollment circuit 340 may be structured to facilitate establishment of a communication channel 60 with the financial institution computing device 30 to selectively provide personal information regarding the user to the device 30 to onboard the user with the financial institution 10. As shown, the account enrollment circuit 340 includes an input/output circuit 342, a communication circuit 344, and a personal information database 346, all of which are communicably and operatively coupled to each other.

The personal information database 346 may be structured to hold, store, or otherwise serve as a repository for personal or confidential information relating to the user 40. Due to the sensitivity of this data, the personal information database may be accessible via passcode (e.g., a password, a biometric, etc.) from the user device 50 and account enrollment client application 220. Once authenticated, the user 40 may populate, add, delete, or otherwise manage the content stored in the personal information database 346. For example, the personal information database 346 may include one or more folders, a search engine, and the like that make storing and locating various information manageable and relatively easy.

The personal or confidential information regarding the user 40 may include any type of personal information regarding the user. In some embodiments, the personal or confidential information may include any type of information that the user 40 desires to keep stored, yet substantially secure. Accordingly, the personal or confidential information may include, but is not limited to, a social security number, a telephone number, a gender, an ethnicity, a height, a weight, a home address, a work address, a work telephone number, a marital status, a name of a beneficiary(ies), a spouse name and other relevant information (e.g., social security number), and so on. This information may be provided as values that are stored in the database 346. In other instances, this information may be provided as files, videos, or any other suitable manner for storage by the personal information database 346. It should be understood that the aforementioned list of personal information is not meant to be limiting as the present disclosure contemplates various other types of personal information that may also be stored by the personal information database 346.

The input/output circuit 342 may be structured to receive and provide communication(s) to a user of the device 50 (or, to another entity such as the financial institution computing device 30). In this regard, the input/output circuit 342 may be structured to exchange data, communications, instructions, etc. with an input/output component of the device 50. Accordingly, in one embodiment, the input/output circuit 342 may include an input/output device such as a display device, a touchscreen, a keyboard, and a microphone. In another embodiment, the input/output circuit 342 may include communication circuitry for facilitating the exchange of data, values, messages, and the like between an input/output device and the components of the user device 50. In yet another embodiment, the input/output circuit 342 may include machine-readable media for facilitating the exchange of information between the input/output device and the components of the user device 50 (e.g., the resource monetization circuit). In still another embodiment, the input/output circuit 342 may include any combination of hardware components (e.g., a touchscreen), communication circuitry, and machine-readable media.

As shown and described herein below, via the input/output circuit 342, a user 40 may provide an input that enables modification, addition, or deletion of one or more pieces of personal information. Further, via input/output circuit 342, the user may make adjustments, deletions, and additions to an electronically generated account registration form to facilitate onboarding of the user 40.

The communication circuit 344 may be structured to facilitate communication with the financial institution computing device 30 to establish and maintain the communication channel 60. In this regard, the communication circuit 344 may be structured to instruct or command the network interface 310 to scan for nearby short-range communication channel financial devices (e.g., Bluetooth or NFC capable devices) as well as instruct the network interface to establish the communication channel 60 with the financial institution device 30. Of course, due to the limited range of the NFC protocol, the scanning for nearby NFC devices may be based on connecting to a network (e.g., a closed network within the financial institution) that provides a message or indication to the communication circuit 344 of all or mostly all of the NFC-capable devices within a particular location. Alternatively, any other means for scanning and/or identifying NFC-capable devices may be implemented and are intended to fall within the scope of the present disclosure.

Accordingly, in one embodiment, the communication circuit 344 includes communication circuitry for relaying, transmitting, or otherwise providing an instruction to the network interface 310 to initiate communications with the financial institution computing device 30. In another embodiment, the communication circuit 344 includes machine-readable media for relaying, transmitting, or otherwise providing an instruction to the network interface 310 to initiate communications with the financial institution computing device 30. In still another embodiment, the communication circuit 344 includes any combination of communication circuitry and machine-readable media for relaying, transmitting, or otherwise providing an instruction to the network interface 310 to initiate communications with the financial institution computing device 30.

In one embodiment, the communication circuit 344 is structured to command or instruct the network interface 310 and, in particular the Bluetooth transceiver 312 and NFC transceiver 316, to constantly monitor for nearby Bluetooth and/or NFC-capable devices. In this regard, the user device 50 may be in an "always on" state for identifying potential devices to pair with. However, many users may feel uncomfortable with this always on state and prefer selectivity.

Accordingly, in another embodiment, the communication circuit 344 is structured to selectively command or instruct the network interface 310 and, in particular the Bluetooth transceiver 312 and NFC transceiver 316, to monitor for, scan for, or otherwise search for nearby Bluetooth and/or NFC-capable devices (i.e., the financial institution computing device 30). Further, the communication circuit 344 may be structured to selectively activate which, of the Bluetooth transceiver 312 and the NFC transceiver 316, is active (i.e., searching/ready to communicate with nearby devices).

The selectivity in commanding or instructing the network interface 310 may be based on a user input received through the input/output circuit 342. For example, the user 40 may enter the financial institution 10 knowing that he/she would like to enroll with one or more products of the financial institution 10 (e.g., open a demand deposit account). Accordingly, the user 40 may provide an input to the user device 50 to activate the account enrollment circuit 340 and, in particular, the communication circuit 344 to cause device scanning by the network interface 310. Because the enrollment process may include the transmission of relatively personal or confidential data of the user 40, the aforementioned "input" may include one or more levels of security. For example, the input may include a predefined biometric input (e.g., fingerprint scanner, retina scan, etc.). In another example, the input may include a pass code (e.g., a pattern; a numeric, alpha, or alpha-numeric password; etc.). In yet another example, the input may include a combination of a pass code and a biometric. In this regard and beneficially, triggering of the communication circuit 344 may be relatively secure.

The selectivity in commanding or instructing the network interface 310 to scan for nearby devices may also be based on at least one of a determined location of the user device 50 or a received input indicative of a location of the user device 50. Responsive to the determined location or the input indicating the user device 50 is in a location indicative of a physical location of a financial institution, such as financial institution 10, the communication circuit 344 may instruct the network interface 310 to scan for, e.g., nearby Bluetooth enabled devices. For example, via location data received by the location circuit 320, the communication circuit 344 may determine or receive an indication that the user device 50 is in a financial institution location and cause activation of at least one of the Bluetooth transceiver 312 and the NFC transceiver 316.

In one embodiment, the communication circuit 344 is structured to permit data flow from the personal information database 346 to the financial institution computing device 30 only in response to being activated. In this regard, the user 40 may utilize at least one of the Bluetooth transceiver 312 and NFC transceiver 316 without activating or otherwise using the account enrollment circuit 340 (i.e., to keep data stored in the personal information database 346 shielded from transmission or accident transmission). In this regard, "activation" is defined as when transmission from the personal information database 346 is allowed to occur rather than determining when to initiate the network interface 310, which is the definition of the term "selectivity" herein.

In one embodiment, the communication circuit 344 is structured to facilitate scanning for nearby devices responsive to being activated. This embodiment may be useful if the user places the user device 50 in a power saving mode.

Activation may be based on any of the aforementioned selectivity processes. For example, activation may be based on reception of an explicit user input to activate the account enrollment circuit 340. As another example, activation may be based on location data indicating that the user device 50 is within a physical location associated with a financial institution. As yet another example, activation may be based on the "tap" itself. For example, when the financial institution device 30 is tapped with the user device 50, the communication circuit 344 may enable the corresponding Bluetooth or NFC transceiver to maintain or establish the communication channel 60.

As mentioned above, the communication circuit 344 is also structured to establish and maintain the communication channel 60. As mentioned above, the communication channel 60 may include at least one a Bluetooth communication channel, a NFC communication channel, and/or a Bluetooth and NFC combined communication channel. Of course, use of these communication protocols is not meant to be limiting as the principles of the present disclosure may be utilized with any short-range wireless technology, where "short-range" may be defined as communication protocol range less than or equal to that of the Bluetooth communication protocol.

During the communication session, personal information stored in the personal information database 346 may be retrieved and provided to the financial institution computing device 30. The financial institution computing device 30 may utilize this information populate an account registration form or otherwise enroll the user 40 with a product of the financial institution 10. Accordingly, the exchange of information over the communication channel 60 may include, but is not limited to, videos, files, and the like.

In one embodiment, the communication circuit 344 is preprogrammed with information required or typically required for certain financial products (e.g., enrollment for a mortgage, enrollment for a demand deposit account, etc.). Accordingly, via an explicit user input received from the input/output circuit 342 and after establishment of the communication channel 60, the communication circuit 344 may search and retrieve the information required or typically required for the selected product. In this regard, the account enrollment circuit 340 may be proactive in nature to increase the rate at which the user 40 becomes enrolled.

In addition to the communication protocols described above that may be the communication channel 60, the communication circuit 344 may also be structured to facilitate, arrange, or otherwise provide synchronous applications. Alternatively, via the communication channel 60, the communication circuit 344 and corresponding financial institution computing device 30 may cause initiation of synchronous applications on the user device 50 and the financial institution computing device 30, respectively.

Figure 4:
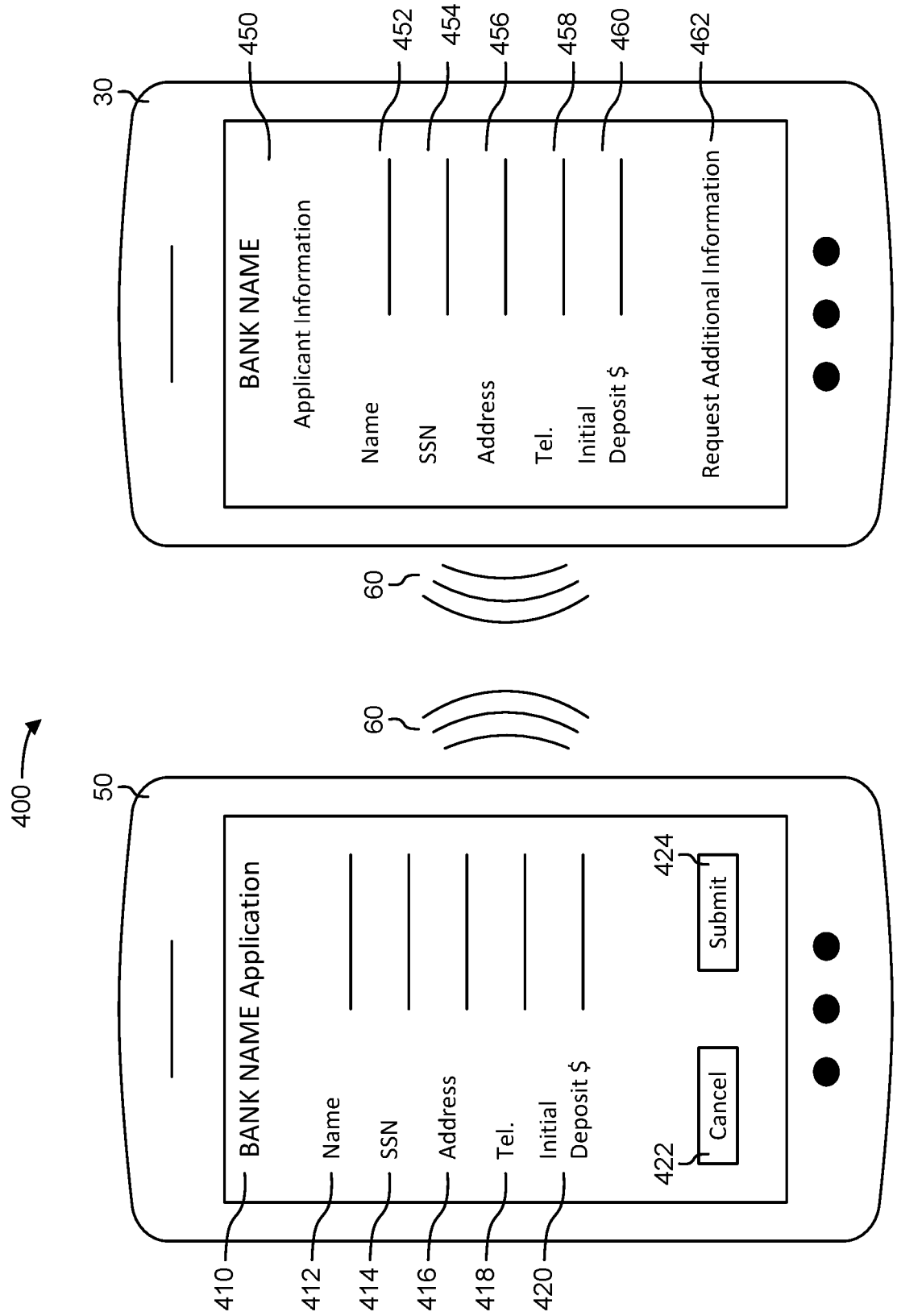
FIG. 4 is a diagram of synced graphical user interfaces of a user device and a financial institution computing device, according to an example embodiment.

Referring now to FIG. 4, an example of the synced applications is shown, according to an example embodiment. The "synchronicity" of the applications refers to the ability of an input on one graphical user interface to be reflected on the synced other graphical user interface. In this regard, the attendant 20 and the user 40 may see in real time or substantially real time the personal or confidential information being transmitted and the enrollment process happening. For example and as shown in the synced application environment 400 of FIG. 4, the user 40 may observe various personal information data points on the graphical user interface 410 of their user device 50. In particular, the user 40 may observe their name 412, social security number 414, address 416, telephone number 418, provide an initial deposit amount 420, and either cancel 422 or submit 424 this data to the attendant 20 of the financial institution computing device 30 to complete the enrollment process. That is to say, while the attendant may visualize this information, the information is not yet submitted for enrollment purposes until the user explicitly submits the information. Similarly, the financial institution computing device 30 may include a graphical user interface 450 that provides fields to observe the applicant's name 452, social security number 454, address 456, telephone number 458, initial deposit amount 460, and whether to request additional information 462. In this example, the user 40 is enrolling, registering, or signing-up for a demand deposit account. Hence, the initial deposit fields 422, 462 provided on the graphical user interfaces 410, 450.

In another example arrangement, the user device 50 serves as an intermediary between the personal information database 346 and financial institution computing device 30. In particular, a user 40 may have provided an indication that they were or are planning to enroll with the financial institution 10 to open up a checking account. After the communication channel 60 is established and rather than directly providing personal information for opening up a checking account, the account enrollment circuit 340 first provides the information to the user device 50 to, e.g., the graphical user interface 410, for the user 40 to observe, modify, add, or delete. Upon an approval received from the user 40, the account enrollment circuit 340 transmits the selected pieces of personal information to the financial institution computing device 30. In this regard and while the account enrollment circuit 340 may be preprogrammed with the information that is typically required to open a checking account, the user 40 still serves as the final arbiter before transmission to the financial institution computing device 30.

Of course, in other embodiment, the data may be provided upon an establishment of the communication channel 60. Some users may prefer this configuration if they are in a hurry and want to expedite the enrollment process even further.

After the transfer of data and either the success or unsuccessful enrollment, cessation of the communication channel 60 may be caused or initiated in a variety of manners. In one embodiment, a user 40 may provide an explicit input to affirmatively end the communication channel 60. Alternatively, the communication circuit 344 may include a timer structured to only maintain the communication channel 60 for a predetermined amount of time. Additionally and beneficially, because the communication channel 60 is structured as short-range channel (such as the NFC or Bluetooth protocol), the communication channel 60 may automatically cease or end responsive to the user 40 moving outside of the transmission range of the user device 50.

In certain embodiments, the input/output circuit 342 may provide a message (e.g., notification, alert, etc.) to the user device 50 to confirm or deny cessation of the communication channel 60. According to another embodiment and as an added layer of circuitry, the communication circuit 344 may facilitate providing a message (e.g., notification, alert, etc.) to a different user device for the user to verify cessation of the communication channel 60. In this regard, the communication circuit 344 may also provide the details (e.g., a report or summary indicating the data that was exchanged, the product applied for, and any other pertinent data) regarding the communication session to one or more additional locations relative to the user device 50. For example, the communication circuit 344 may, in addition to providing the details to the user 40 via the account enrollment application 220, provide the details to a designated email account of the user. In another example, the communication circuit 344 may provide the details on a website provided by the financial institution and accessible from a link transmitted as either a text message or as an email message to the user. Some financial institutions may even require an additional input once the user access the report of the communication session to confirm or deny the accuracy and finish the enrollment process.

Figure 5:
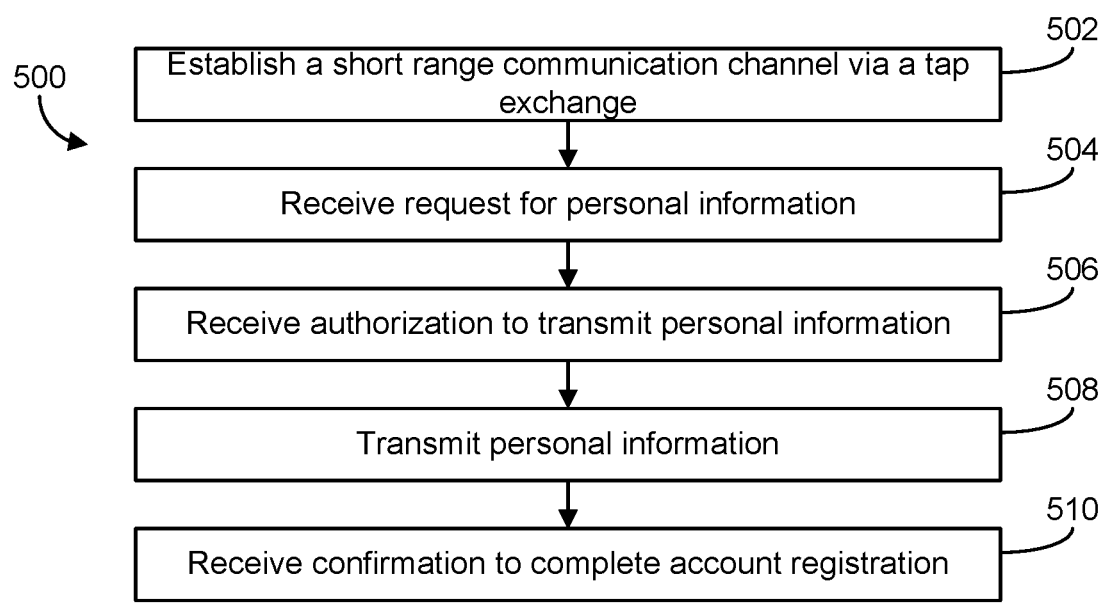
FIG. 5 is a flow diagram of a method of onboarding or enrolling a customer with a financial institution via a short-range communication channel, according to an example embodiment.

Referring now to FIG. 5, a process 500 of onboarding or enrolling a customer with a financial institution via a short-range communication channel is shown, according to an example embodiment. Because the process 500 may be implemented with the account enrollment circuit 340 of FIGS. 1-3, reference may be made to various components of the account enrollment circuit 340 and the computing system 200 in general to aid explanation of process 500.

At process 502, a short range communication channel is established via a tap exchange. The communication channel may have the same structure and configuration as mentioned above. Further and as also mentioned above, a "tap" exchange may include a pairing process to establish a short range communication channel. In one embodiment, the tap may include a Bluetooth communication pairing process. In this regard, the user of the user device 50 and/or the attendant of the financial institution computing device 30 may be required to affirmatively pair the user device with the financial computing device 30. Such pairing may also include providing a passcode to add an extra layer of security to prevent or substantially prevent unauthorized pairing with at least one of the user device 50 and the financial institution computing device. As also mentioned above, the "tap" may also include a NFC tap. The NFC tap may be useful due to its relatively shorter communication range to prevent unauthorized short range communication channels. Further, in some embodiments, the short range communication channel may include a combination of the NFC and Bluetooth protocol (e.g., an NFC tap to provide authorization for the communication channel via the user device and the financial computing device followed by establishment of the Bluetooth communication channel).

Before, during, or slightly after the tap (e.g., within a predefined amount of time before or after the tap, such as one minute), various security protocols may be implemented. In particular, the communication circuit 344 may include selectivity to control when the network interface of the user device 50 is capable of establishing the communication channel. Further, the communication circuit 344 may also be adapted to only permit establishment of the communication channel after activation of the communication circuit 344, wherein activation may be based on receiving an explicit user input (e.g., a passcode received via the account enrollment client application 220), geographical data indicating that the user device is within a physical location associated with a financial institution, and/or some other process as described herein above. As mentioned above, activation may be required to enable the flow of data from the personal information database 346 to the financial institution computing device 30.

Process 502 may also include receiving a designation of a product that the user desires to utilize (i.e., signing-up, enrolling, or otherwise on-boarding with). Such designation may dictate the selectivity and/or activation processes as described above. For example, responsive to designation of products that typically require relatively less personal information, the communication circuit 344 may cause the network interface to search for devices immediately, or, the communication circuit 344 may be activated immediately to allow the personal information to be retrieved and transmitted. However, responsive to the designation of a product that typically requires relatively more or user-defined sensitive personal information, the communication circuit 344 may require a passcode from the user prior to searching and/or activation. Such processes may provide additional layers to securely storing the user's personal information.

At process 504, a request for personal information is received. The request may be provided by the financial computing device 30 over the communication channel 60. In some embodiments, the request may be specific to refer to the explicit types of personal information needed (e.g., social security number, etc.). In one embodiment, during process 504, the attendant and user may utilize synced applications (see FIG. 4), such that the user and attendant may see in real time or substantial real time the data requested and the data being transmitted.

At process 506, authorization to transmit personal information is received. In one embodiment, the authorization may include a demarcation or designation of the specific types of personal information that is transmitted. For example, the user may, via the account enrollment client application 220, see a list of their person information stored in the personal information database 346 and selectively pick specific data to transmit. In another embodiment, during, before, or after establishment of the communication channel, the user may provide an input describing the financial institution product he/she is applying, registering, or otherwise enrolling with in order to utilize. As a result, the communication circuit 344 may provide a predefined "package" of personal information typically associated with that product (e.g., if the product is a demand deposit account, the package may include an address, name, telephone number, social security number, and initial deposit amount whereas if the product if a mortgage application, the package may include an address, telephone number, name, social security number, down-payment amount, and pertinent tax information). In this regard, providing of the package may speed-up the enrollment process. This configuration may be utilized when the user designates a desired financial product, as described above in process 502.

At process 508, responsive to receiving authorization, personal information is transmitted via the short-range communication channel to the financial institution computing device.

At process 510, a confirmation is received to complete the account registration. Process 510 may include generating and providing, via the account enrollment client application 220, a graphical user interface of the personal information provided along with an option for a user to submit, cancel, or modify the information. Responsive to submission, the financial institution computing device 30 may provide receipt confirmation over the communication channel 60 to the user device 50. The receipt confirmation may indicate that the product application was successfully submitted and that the financial institution will contact the user shortly regarding the next steps. The receipt confirmation may be stored in the personal information database 346, such that the user may access the receipt confirmation at will.

In some embodiments, the financial institution computing device 30 may then provide the relevant information to the financial institution computing system 240 to finish the enrollment process. In other embodiments, the enrollment process may be accomplished completely on the financial institution computing device 30, such that the user device 50 may be enrolled (or denied enrollment) immediately following transmission.

With the above in mind, an example of process 500 may be described as follows. A user enters a physical location associated with a financial institution (e.g., a branch location). The location circuit provides data to the account enrollment circuit confirming that the user is within the physical location associated with the financial institution. In response, the communication circuit 344 causes the network interface 310 to begin scanning for financial institution computing devices (in this regard, "selectivity" as defined herein is based on the location data). The user may then provide an input to indicate the type of product that he/she is interested in utilizing (e.g., a checking and a savings account). At some time in the future, the user may tap their user device with the financial institution computing device to establish a short-range communication channel. In this example, the tap also activates the communication circuit to begin to allow personal information to be retrieved and transmitted via the communication circuit 344. After the tap, the user may observe the type of data that will be transmitted and selectively allow or deny such transmission (i.e., the user device is serving as the intermediary between the financial institution computing device and the personal information database 346). After all the data is transmitted, the user device 50 may receive a receipt confirmation of enrollment with the checking account. Or, alternatively, the financial institution computing system 240 may be required to perform additional processes prior to enrollment.

In either event, enrollment may occur relatively faster due to not needing to physically fill-out various forms. Further, accuracy of the data may be relatively higher because the data transmitted is previously provided by the user such that the user can confirm the accuracy of that data (the attendant may make typographical errors). As a result, the user may experience a relatively more pleasant enrolling process.

Technically, the systems, methods and apparatuses described herein may transform operation of a user device, such as a smartphone, to selectively utilize one or more network interfaces (e.g., NFC, Bluetooth, etc.) to establish a secure or relatively secure communication channel. Further, the user device may now serve as a repository or storage site for personal information of the user. In another embodiment, the personal information may be stored in the cloud. In either arrangement, the user may appreciate the flexibility provided by the systems herein to retain their personal and confidential information relatively securely.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A computing device associated with a financial institution, the computing device comprising:
    a network interface enabling the computing device to exchange information over a network;
    one or more processors; and
    non-transitory machine-readable media storing instructions that, when executed by the one or more processors, cause the one or more processors to perform operations comprising:
    establishing a short-range communication channel with a user device associated with a user based on a tap exchange;
    receiving personal information from the user device over the short-range communication channel, the personal information associated with an enrollment of the user with a product of the financial institution; and
    providing the personal information to a computing system associated with the financial institution to enroll the user with the product.

2. The computing device of claim 1, wherein the short-range communication channel is at least one of a Bluetooth communication protocol or a near-field communication protocol.

3. The computing device of claim 1, wherein the tap exchange is a near-field communication tap, and wherein the short-range communication channel is a Bluetooth communication protocol.

4. The computing device of claim 1, wherein the personal information is encrypted.

5. The computing device of claim 1, the operations further comprising providing a receipt confirmation to the user device responsive to providing the personal information to the computing system, the receipt confirmation indicating that an application for the enrollment of the user with the product was successfully submitted to the financial institution.

6. The computing device of claim 1, wherein the product includes at least one of a demand deposit account, a mortgage application, a certificate of deposit account, a money market account, an individual retirement account, or a loan application.

7. The computing device of claim 1, the operations further comprising providing a data request to the user device responsive to establishing the short-range communication channel, the data request indicating particular personal information required to enroll the user with the product, wherein the personal information received from the user device comprises the particular personal information.

8. The computing device of claim 1, wherein the enrollment is a first-time enrollment process for the user with the financial institution.

9. The computing device of claim 1, wherein the computing device further comprises a graphical user interface (GUI) configured to display the personal information received over the short-range communication channel, the GUI updated as new personal information is received over the short-range communication channel.

10. A method for enrolling a user with a product of a financial institution, the method comprising:
    establishing, by a computing device associated with the financial institution, a short-range communication channel between the computing device and a user device associated with the user based on a tap exchange;
    receiving, by the computing device, personal information from the user device over the short-range communication channel, the personal information associated with an enrollment of the user with the product of the financial institution; and
    providing, by the computing device, the personal information to a computing system associated with the financial institution to enroll the user with the product.

11. The method of claim 10, wherein the short-range communication channel is at least one of a Bluetooth communication protocol or a near-field communication protocol.

12. The method of claim 10, wherein the tap exchange is a near-field communication tap, and wherein the short-range communication channel is of a Bluetooth communication protocol.

13. The method of claim 10, wherein the personal information is encrypted.

14. The method of claim 10, further comprising providing, by the computing device, a receipt confirmation to the user device responsive to providing the personal information to the computing system, the receipt confirmation indicating that an application for the enrollment of the user with the product was successfully submitted to the financial institution.

15. The method of claim 10, wherein the product includes at least one of a demand deposit account, a mortgage application, a certificate of deposit account, a money market account, an individual retirement account, or a loan application.

16. The method of claim 10, further comprising providing, by the computing device, a data request to the user device responsive to establishing the short-range communication channel, the data request indicating particular personal information required to enroll the user with the product, wherein the personal information received from the user device comprises the particular personal information.

17. The method of claim 10, wherein the enrollment is a first-time enrollment process for the user with the financial institution.

18. The method of claim 10, further comprising:
- displaying, by the computing device, the personal information received over the short-range communication channel on a graphical user interface (GUI) of the computing device; and
- updating, by the computing device, the GUI as new personal information is received over the short-range communication channel.

19. A method for enrolling a user with a product of a financial institution, the method comprising:
- establishing, by a computing device associated with the financial institution, an encrypted short-range communication channel between the computing device and a user device associated with the user based on a tap exchange;
- receiving, by the computing device, personal information from the user device over the encrypted short-range communication channel, the personal information associated with an enrollment of the user with the product of the financial institution;
- populating, by the computing device, an account registration form with the personal information; and
- providing, by the computing device, the account registration form to a computing system associated with the financial institution to enroll the user with the product.

20. The method of claim 19, wherein:

the account registration form is provided to the computing system responsive to receiving an approval message from the user device indicating that the user confirmed an accuracy of the personal information; and the encrypted short-range communication channel is at least one of a Bluetooth communication protocol or a near-field communication protocol.

* * * * *